United States Patent
Arunkumar et al.

(10) Patent No.: US 6,691,147 B1
(45) Date of Patent: Feb. 10, 2004

(54) METHOD AND APPARATUS SUPPORTING NETWORK COMMUNICATIONS

(75) Inventors: Nagaraj Arunkumar, San Jose, CA (US); Ly Loi, Fremont, CA (US); Chandrasekharan Nilakantan, Cupertino, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/455,841

(22) Filed: Dec. 7, 1999

Related U.S. Application Data

(62) Division of application No. 08/739,397, filed on Oct. 31, 1996.

(51) Int. Cl.⁷ .................................................. G06F 15/16
(52) U.S. Cl. ...................................... 709/200; 709/232
(58) Field of Search ............................... 709/200, 237, 709/250, 218, 228, 230, 231, 249, 232; 370/419, 252, 94; 706/60; 340/826; 710/8, 10; 713/1

(56) References Cited

U.S. PATENT DOCUMENTS

| | | | |
|---|---|---|---|
| 4,943,932 A | * 7/1990 | Lark et al. ..................... 706/60 |
| 5,289,179 A | * 2/1994 | Beeson, Jr. et al. ......... 340/826 |
| 5,434,863 A | 7/1995 | Onishi et al. ................ 370/402 |
| 5,485,460 A | * 1/1996 | Schrier et al. ................. 370/94 |
| 5,490,251 A | * 2/1996 | Clark et al. .................. 709/237 |
| 5,490,252 A | * 2/1996 | Macera et al. .............. 709/249 |
| 5,541,911 A | 7/1996 | Nilakantan et al. ......... 370/422 |
| 5,574,861 A | 11/1996 | Lorvig et al. .......... 395/200.06 |
| 5,583,997 A | 12/1996 | Hart ............................ 709/218 |
| 5,594,921 A | 1/1997 | Pettus ................... 395/200.57 |
| 5,613,123 A | * 3/1997 | Tsang et al. .................... 713/1 |
| 5,655,148 A | * 8/1997 | Richman et al. ................ 710/8 |
| 5,657,452 A | 8/1997 | Kralowetz et al. ..... 395/200.57 |
| 5,663,951 A | 9/1997 | Danneels et al. ............ 370/230 |

(List continued on next page.)

OTHER PUBLICATIONS

Sivakumar et al, Rapid Prototype Environment for the Specification & Automatic Synthesis of Controllers for Interconnection Routers, IEEE 1996.*
The Point–to–Point Protocol (PPP), W. Simpson, RFC 1661, Jul. 1994.
The PPP Multilink Protocol, K. Sklower et al., RFC 1717, Nov. 1994.
PPP over ISDN, W. Simpson, RFC 1618, May 1994.
MIT Telecommunications Network, W. Mansell, Dec. 28, 1995.
Cisco 1003 ISDN Router, Cisco System, Apr. 7, 1995.

*Primary Examiner*—Mark R. Powell
*Assistant Examiner*—Thong Vu
(74) *Attorney, Agent, or Firm*—McDonnell Boehnen Hulbert & Berghoff

(57) ABSTRACT

One embodiment of the invention includes a method of managing network communications in a network device. The network device includes software components and modules. Some of the components control the interaction between modules, while other components perform specific functions for associated modules. A module manager component controls the creation and destruction of modules as well as their interactions. A communications manager component manages network communications in the network device. The network communications is supported by creating a number of modules that are associated with components that implement different parts of a network protocol. As a result of the use of the modules, a component need not know which other component(s) it depends upon, nor need it know which other component(s) depend upon it. This allows components to be used together very easily in many different configurations. The modules also allow the same component to be used by multiple modules.

18 Claims, 7 Drawing Sheets

U.S. PATENT DOCUMENTS

| | | | |
|---|---|---|---|
| 5,742,607 A * | 4/1998 | Beighe et al. | 370/419 |
| 5,742,773 A | 4/1998 | Blomfield-Brown et al. | 395/200.58 |
| 5,754,766 A * | 5/1998 | Shaw et al. | 709/200 |
| 5,768,525 A | 6/1998 | Kralowetz et al. | 395/200.58 |
| 5,781,797 A * | 7/1998 | Crick et al. | 710/10 |
| 5,790,676 A | 8/1998 | Ganesan et al. | 380/23 |
| 5,802,307 A * | 9/1998 | Melo | 709/232 |
| 5,802,366 A * | 9/1998 | Row et al. | 709/250 |
| 5,809,235 A * | 9/1998 | Sharma et al. | 709/230 |
| 5,809,237 A | 9/1998 | Watts et al. | 709/202 |
| 5,819,042 A | 10/1998 | Hansen | 709/232 |
| 5,850,388 A * | 12/1998 | Anderson et al. | 370/252 |
| 5,894,557 A * | 4/1999 | Bade et al. | 709/228 |
| 6,032,187 A | 2/2000 | Blain | 709/230 |
| 6,230,193 B1 * | 5/2001 | Arunkumar et al. | 709/218 |
| 6,275,869 B1 * | 8/2001 | Sieffert et al. | 709/231 |

* cited by examiner

METHOD AND APPARATUS SUPPORTING NETWORK COMMUNICATIONS

RELATIONSHIP TO COPENDING APPLICATIONS

This application is a Division of application Ser. No. 08/739,397, filed Oct. 31, 1996, entitled "Method and Apparatus Supporting Network Communications", which is incorporated herein by reference in its entirety.

1. THE BACKGROUND OF THE INVENTION a. The Field of the Invention

This invention relates to the field of network communications. In particular, the invention relates to a network system having an architecture that supports a flexible and efficient interconnection of protocol layers.

b. Background Information

Efficient data throughput and simpler control and configuration are important characteristics of network devices, such as routers. However, as more network protocols are supported, the task of configuring and maintaining the network devices becomes more daunting. As customers demand more flexibility and features of the network devices, the deficiencies of the present data flow and control flow of network devices becomes more apparent.

Present port and path management systems illustrate some of the deficiencies. In some port and path management systems, designers must write code to support specific link set-up and channel set-up protocol combinations. For example, to support point-to-point protocol (PPP) over an ISDN channel, specific code must be written. If a customer wants PPP over frame-relay over a high speed serial device (HSS), then the designers must modify the PPP code and combine it with new code to support the particular configuration. If a customer wants some other combination of PPP and frame-relay, again the designers need change both the PPP code and the frame-relay code. Adding features such as providing additional bandwidth on demand by bundling multiple paths for use by a single port can be even more difficult. This perpetual need to change the code that supports the various parts of the network protocol leads to a system that can be difficult to debug, difficult to extend, difficult to customize, and difficult to support.

Focusing on the difficulty in customization, present systems make adding security features or compression features to the network device very difficult. The new features must be written directly into the already existing code. Selectively including such features may require two or more completely different sets of code. This makes supporting such systems difficult.

Therefore, what is needed is a network system including an improved architecture that is more extensible, flexible and customizable than present networks.

2. A SUMMARY OF THE INVENTION

A method and apparatus to interconnect network protocol layers providing high-performance data transfers and flexible controls is described.

One embodiment of the invention includes a system for providing network communications through a set of network protocol layers. The system has a processor, a memory and a physical media connection. The processor is coupled to the memory and the physical media connection. A first layer of the set of network protocol layers provides an interface to the physical media connection. A second layer of the set of network protocol layers provides an interface to a different network protocol layer than the first layer. The network communications includes a plurality of control events. The system also includes the following elements. A plurality of components where each component implements at least part of a layer in the set of network protocol layers. The plurality of components includes a first component and a second component. The first component implements the first layer, the second component implements the second layer. A first module provides a first interface to the first component. A second module provides a second interface to the second component. A configuration definition defines a subset of the set of network protocol layers, where the subset includes the first layer and the second layer. A communications component causes a creation of the first module and the second module in response to the configuration definition. A first state machine is coupled to the first module and the second module. The first state machine causes a communication of a first control event of the plurality of control events between the first module, the second module, and the communications component. Thus, the modules allow the components to interact without requiring the components to know which other components a specific component is interacting with.

In one embodiment, a module can be used to bundle channels together. In this embodiment, a module has multiple dependent child modules. Control information received by the module can be distributed to each of the child modules. Network data can be sent directly to each of the dependent child modules' associated components. In another embodiment, a module can depend upon multiple parent modules.

Although many details have been included in the description and the figures, the invention is defined by the scope of the claims. Only limitations found in those claims apply to the invention.

3. A BRIEF DESCRIPTION OF THE DRAWINGS

The figures illustrate the invention by way of example, and not limitation. Like references indicate similar elements.

4. THE DESCRIPTION a. An Overview of an Embodiment of the Invention

One embodiment of the invention includes a method of managing network communications in a network device. The network device includes software components and modules. Some of the components control the interaction between modules, while other components perform specific functions for associated modules. A module manager component controls the creation and destruction of modules as well as their interactions. A communications manager component manages network communications in the network device. The network communications is supported by creating a number of modules that are associated with components that implement different parts of a network protocol. As a result of the use of the modules, a component need not know which other component(s) it depends upon, nor need it know which other component(s) depend upon it. This allows components to be used together very easily in many different configurations. The modules also allow the same component to be used by multiple modules.

In one embodiment, each module includes a set of rules for ensuring that event information is passed between the module and any dependent modules and/or components, including the module manager. The module manager ensures that any other components (such as the communications manager) are also notified of these events. Data is transferred quickly between the components implementing network communications by referencing the components' associated modules. In one embodiment, some modules use a quick data transfer reference. Only some modules that support quick data communications will have such a reference. Therefore, components not needed for quick data transfer are skipped during a quick data transfer. Being able to skip components improves the data throughput rate of one embodiment of the invention.

In another embodiment, some modules support multiple dependent child modules. Such modules allow the network device to more easily support bundled channels for a single port. Each dependent child module can support a different channel for use by a single port. Similarly, some modules support multiple dependent parent modules. Such modules allow the network device to share a single channel between multiple ports. The modules that support multiple dependent children and/or parents provide users with greater flexibility in configuring their network devices.

b. A Network Including One Embodiment of the Invention

Figure 1:
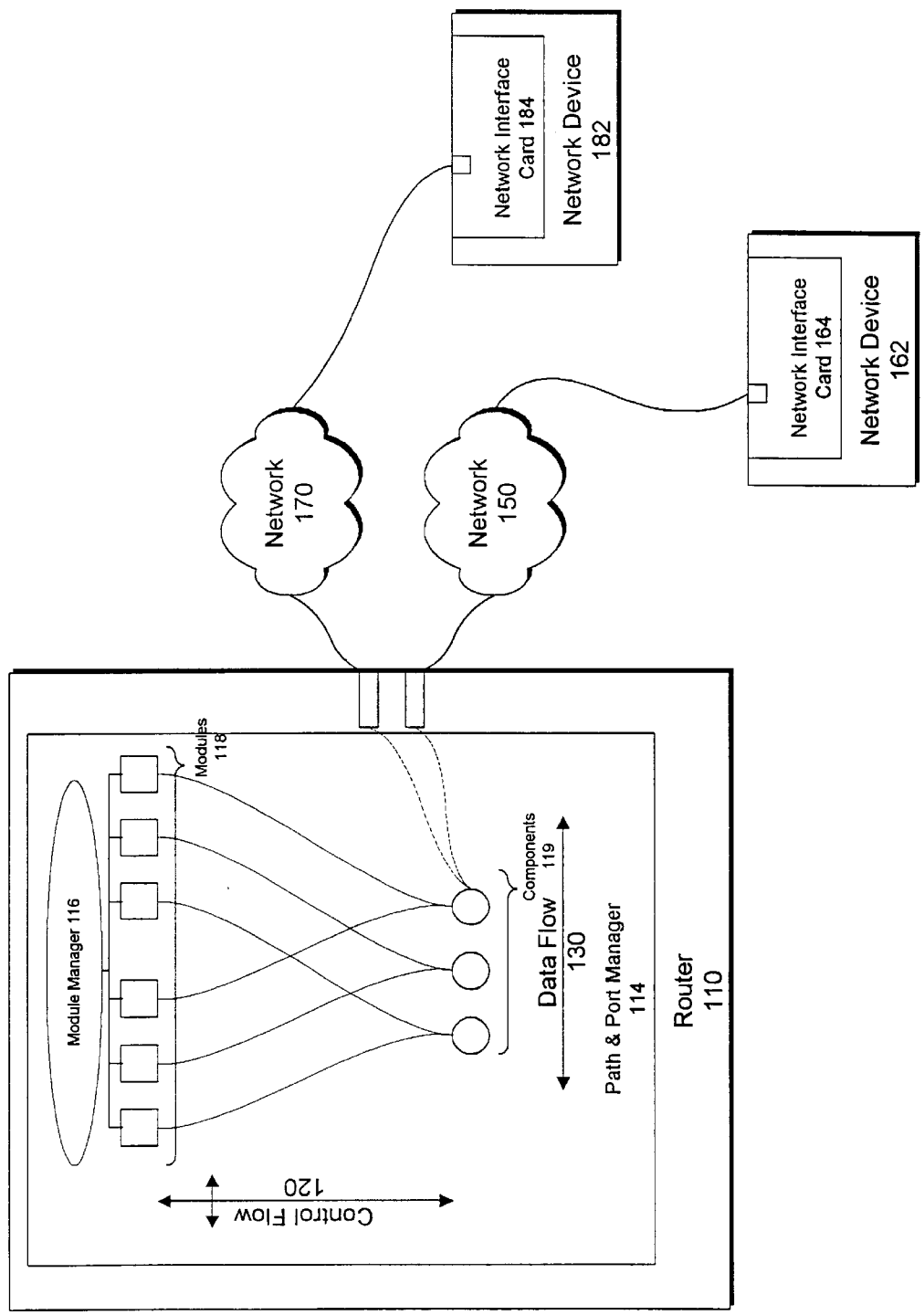
FIG. 1 illustrates a network including one embodiment of the invention.

FIG. 1 illustrates a network including one embodiment of the invention. The following first identifies all of the elements in FIG. 1 and then describes their operation.

FIG. 1 includes a router 110, a network 150, a network 170, a network device 162 and a network device 182. The router 110 includes a path and port manager 114. The path and port manager 114 includes components 119, modules 118, and a modules manager 116. The network device 182 includes a network interface card 184. The network device 162 includes a network interface card 164.

The router 110 represents one type of network device in which one embodiment of the invention may be used. However, the invention is not restricted to use in only a router 110. Rather, the invention can used in any device supporting network communications. For example, the network interface cards 164 and 184 can include embodiments of the invention. The router 110, being representative of any such network device, includes at least one processor, some memory and one or more network connections. The processor is for processing instructions to manipulate data stored in the memory. Data is transferred and received at the network connections. The processor causes the data to be manipulated in such a way as to enable network communications.

The network communications in the router 110 is achieved using paths and ports. A path represents a physical attachment to a network media. For example, a path can represent a cable connection or a wireless connection to a network. A port represents a logical network, as viewed by the network layers, and a data-link type of that logical network. For example, a port can represent a single network to a Internet Protocol (IP) network protocol layer function.

The components 119 supply the network protocol functionality to support the port and the path. The modules 118 ensure that the components 119 interact properly so as to support the port and the path. The module manager 116 manages the creation, deletion and interactions of the modules 118. To create a port, the module manager 116 creates the modules 118 in a stack. Each module in the stack corresponds to a different component that supports a different part of the communications protocol necessary to create a port. That is, the stack supports the data flow 130 and the control flow 120 between a device driver for accessing the network (e.g., an ISDN modem) and the network attachment layer (e.g., the subnet layer and transparent bridge components). The module manager 116 acts as a state machine for each module, indicating the actions to be taken (e.g., function calls, direction in which to send an event, etc.). In another embodiment, the modules 118 stack supports parts of network communications other than a port, such as a virtual circuit, and an ISDN channel, Internet Protocol (IP).

In one embodiment, each component 119 is a process, each module 118 is a data structure, and the module manager 116 includes a state machine for calling functions referenced by modules 118 to pass events between modules 118 and components 119. The modules 118 also include references to functions in parent and child components 119 for passing network data.

The interaction between the components includes the transfer of control data (control flow 120) and the transfer of network data (data flow 130). The modules 118 and the module manager 116 act together to form state machines to ensure that the control flow 120 occurs between the components 119 and any other components in the system (see below for more information). The modules 118 provide references for the components to quickly pass network data from one component to the next without requiring a given component to know who its neighbor component is. Because components do not know who their neighbor are, a designer can write the functionality of the component without concern for how other components work. Therefore, a specific component can be written to implement PPP, another can be written to implement frame-relay, yet another can be used to generate debugging data. By using the module stack, the components can be mixed together to suit the user's needs.

Note that in FIG. 1, the data flow 130 is shown as being optimized for flow between components while the control flow 120 is shown as flowing between components and modules. This representation emphasizes the ability of one embodiment of the invention to quickly pass network data between components.

To illustrate the flexibility of one embodiment of the invention, the example of FIG. 1 includes two sets of the modules 118 using the same components 119 to support two ports over two paths. As will be described below, because of the characteristics of the modules 118, two or more modules 118 can share the same component 119. Note also that one of the components 119 is communicating with each network connection. This component represents a device driver for two different devices.

c. A Port and Path Manager

Figure 2:
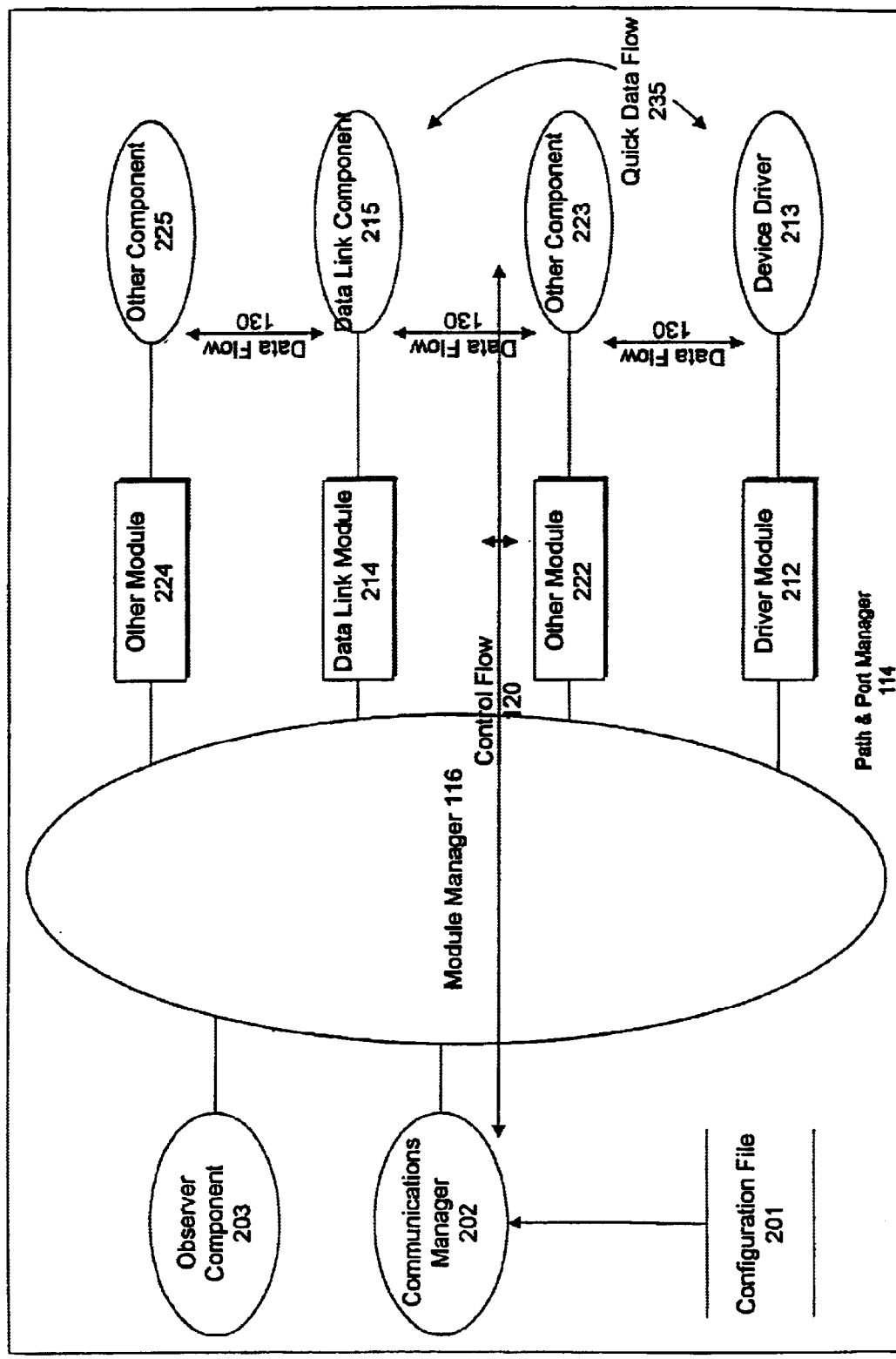
FIG. 2 illustrates a path and port management system used in the network of FIG. 1.

FIG. 2 illustrates a path and port management system used in the network of FIG. 1. This path and port management system can be used in any device needing network communications. The following first identifies each of the elements in FIG. 2 and then describes those elements.

FIG. 2 includes a configuration file 201, a communications manager 202, the module manager 116, and a stack of a number of modules 118 and a number of components 119. The modules 118 include a driver module 212, an other module 222, a data link module 214, and an other module 224. The components 119 include an observer component 203, a device driver 213, an other component 223, a data link component 215 and an other component 225.

The configuration file 201 defines which components 119 to use to establish a port for a particular path (or paths). For example, the configuration file 201 defines the following stack: a path used by the device driver 213; that the other component 223 should be above the device driver in the network protocol used to implement the network communications; that the data link component 215 is above the other component 223; and that the other component 225 is above the data link component 215. In another embodiment, in place of the configuration file 201, the network device, through a user interface, allows a user to directly define which components 119 to use in establishing network communications. Irrespective of which embodiment is used, what is important is that there exists some definition of the which components are to be used.

Given the definition in the configuration file 201, the communications manager 202 sends requests to the module manager 116 to create the various modules 118, associated with the various components 119, so that network communications will be provided. An example of this is described below. The communications manager 202 is an example of an observer component 203. An observer component registers with the module manager 116 to be notified when certain events occur. For example, the communications manager 202 will register with the module manager 116 to be notified when a module reports that a component has become available. Upon receiving AVAILABLE message, the communications manager 202 will send a message to the component to enable the component. Examples of observer components 203 of functions performed by observer components are identification of owners of unknown types of data packets, testing, and statistics gathering. The use of the module manager 116 by the observer component 203 prevents the observer component 203 from having to poll components regarding their status, a potentially time consuming process.

The module manager 116 manages the modules 118 in the path and port manager 114. As noted above, the module manager 116 causes modules 118 to be created. Modules are created when a new device becomes available (e.g. at boot time or on a hot-swap of a network access device into the network device) or as directed by the configuration file 201. In one embodiment, the module manager 116 is responsible for ensuring that memory is allocated for the module 118 data structures. Upon creation, the module manager 116 notifies the associated component of the module's creation. This allows the component to register references to specific functions within the component. These functions can then be used to notify the component of particular events as well as pass data to the component. Registration is described in greater detail below. The module manager 116 is also responsible for module destruction. The stack of modules is deleted when a device becomes unavailable (e.g., an network interface card is hot-swapped out). However, the entire stack is not deleted if several devices are multiplexed onto one port; for example, if multiple paths to a port exist and each path maps to a different network access device. In this case, only the module owned by the driver component for that device is deleted.

Modules are linked to a module stack either statically or dynamically. The static creation of the module stack occurs when the configuration file 201 explicitly defines the type and order of the modules. Modules are dynamically linked in a number of cases, for example, in bandwidth-on-demand network communications, disaster recovery, modem pooling (for both incoming and outgoing call), and dial-on-demand.

In one embodiment, the module manager 116 also includes network protocol layer rules. Based upon the type of component, associated with a module, the module manager 116 will know where the module should be relative to other modules in the stack. To apply the rules, each component is categorized by network layer. For example, a point-to-point protocol (PPP) component and a frame relay component fall into a data link category while a high speed serial interface driver and an ISDN driver fall into a device driver category. The module manager 116 includes a rule that requires modules 118 corresponding to data link components 119 are above modules 118 corresponding to device driver components 119. These rules make configuring a network device simpler because a user need only define which components are to be used, in the configuration file 201, and the module manager 116 will ensure that the modules 118 are built in the stack in the correct order.

In one embodiment, the module manager 116 also includes an ability to define a specific order of the modules 118. For example, in one embodiment, the module manager 116 includes an application program interface (API) that includes the following functions insertModulAfter (uniqueModuleID) and linkModuleAbove (uniqueModuleID).

In the example of FIG. 2, the module manager 116 causes the creation of the data link module 214 above the driver module 212 because the type of associated component requires this ordering. For the other module 222 and the other module 224, because their associated components are of unknown type, the module manager 116 is instructed by the configuration file 201 where in the stack the other module 222 and the other module 224 are to be included.

In one embodiment, the module manager 116 also has the responsibility of passing events between dependent modules 118. As noted above, the module manager 116 includes a state machine for ensuring that proper notification of dependent modules 118 and/or components 119 occurs when a module receives an event. The rules used by the module manager 116 are described below.

As noted above, in one embodiment, each module includes a data structure and each component includes a process. The components implement specific functions and allow other components to call those functions through the use of the information in the modules. Each component registers references to these functions, through the module manager 116, in that component's associated module. In one embodiment, registration involves filling in each of the following module fields that relates to the component. In this embodiment, the components 119 and the module manager 116 are written in the C programming language which supports calling functions by using pointers. That is, in one embodiment, each module includes the following information:

Owner ID—this is the identity of the component associated with the module. The component associated with the module is called the module owner or owner component. This field is useful for debugging. For example, the other module 224 would have an owner field identifying the other component 225.

State—this is the state of the module for use by the state machine in the module manager 116.

Upstream and downstream links—modules are linked through upstream and downstream links. Given a module, the upstream link points to the module above it and the downstream link points to the module below it. A module may have more than one upstream link and downstream link. For example, the representation of a bundle of channels is through several downstream links. In one embodiment, these links are 32-bit pointers to modules. In other embodiments, the links are unique module identifiers. Returning to the example of FIG. 2, the data link module 214 would have an upstream link identifying the other module 224 and a downstream link identifying the other module 222.

Transmit and receive module pointer—a pointer to a module which contains the next transmit and receive function pointer. This is used to speed up the network data transmission. Using downstream and upstream module pointers to access the transmit and receive functions of upstream and downstream components would slow down the network data transmission/reception since some modules are used only for control data transfer, and thus have NULL transmit and receive function pointers. For example, the driver module 212 includes an upstream receive module pointer that points to the other module 222. However, if the example is changed so that the other component 223 does not receive network data, then the driver module 212 would point to the data link module 214.

Transmit and receive function pointers—the functions in the module owner for network data transfer. Note, in one embodiment, for performance reasons, two transmit functions may be supported (a quick and a standard). Thus, in FIG. 2, not only does a standard data flow 130 exist, but a quick data flow 235 exists. The quick data flow 235 represents data transmitted using the quick function. Note that the quick function can be used, for example, where limited processing of a packet is required because the packet is to be forwarded elsewhere for processing or performance critical applications.

Control function pointer—each owner component registers a control function which provides query functionality and control commands. This function is the entry point to an owner component. Queries, and controls are all part of the control flow 120. Queries generated by one component that are directed to another component are sent as part of the control flow 120. In one embodiment, the argument of a query includes a packet (optional) and a requested action in the call (e.g., encapsulate this packet, tell me the queue depth, check this packet's validity). An example of a query would be a protocol dispatcher receiving a packet of unknown protocol and calling each control function for each module to inquire whether the packet is of its protocol. Another example would be a distribution protocol machine sending a packet down a module stack and requesting that each control function encapsulate a header. The tail module in the module stack would return the encapsulated packet and the DPM would save the packet header in its cache.

Notification function pointer—in one embodiment, this is a linked list of function pointers that point to functions which are invoked by the module manager 116 when a defined set of events happen (e.g., events relating to status or new configuration information). Some examples are a bandwidth-on-demand component may want to be notified when a maximum bandwidth has been reached or a dial component may want to be notified every time a path status changes so it does not have to regularly check the communications manager 202 state. An advantage gained by using the notification function is that a component need not regularly poll other components for a particular state. As a certain event occurs, the component will be notified.

Module ID—The module ID is the common identifier used by the components 119, modules 118, the module manager 116 to identify specific modules 118. The module ID is unique to each module. The module ID can also be used as a handle for the module component: when a module N passes a data packet to N+1, for example, it also passes the module id which will be used by the owner. Also, the module manager 116 uses the module ID to identify the associated component for a given module.

Module_owner control block (MCB) pointer—this points to a component owner control block. The owner has a control block for each module which it owns. This pointer is passed as an argument when a transmit, receive, or control function is called. The module ID is sufficient for a component owner to trace a control block but the MCB pointer improves the data transfer rate. The data transfer rate is improved because providing a control block pointer to the component owner saves the owner the extra step of mapping a module ID to a control block pointer to determine the context in which the component is operating. The module ID and the module control block allow multiple modules to be owned by the same component.

d. Module Interactions

The following describes the event passing and data flow interactions between modules and components.

Figure 3A:
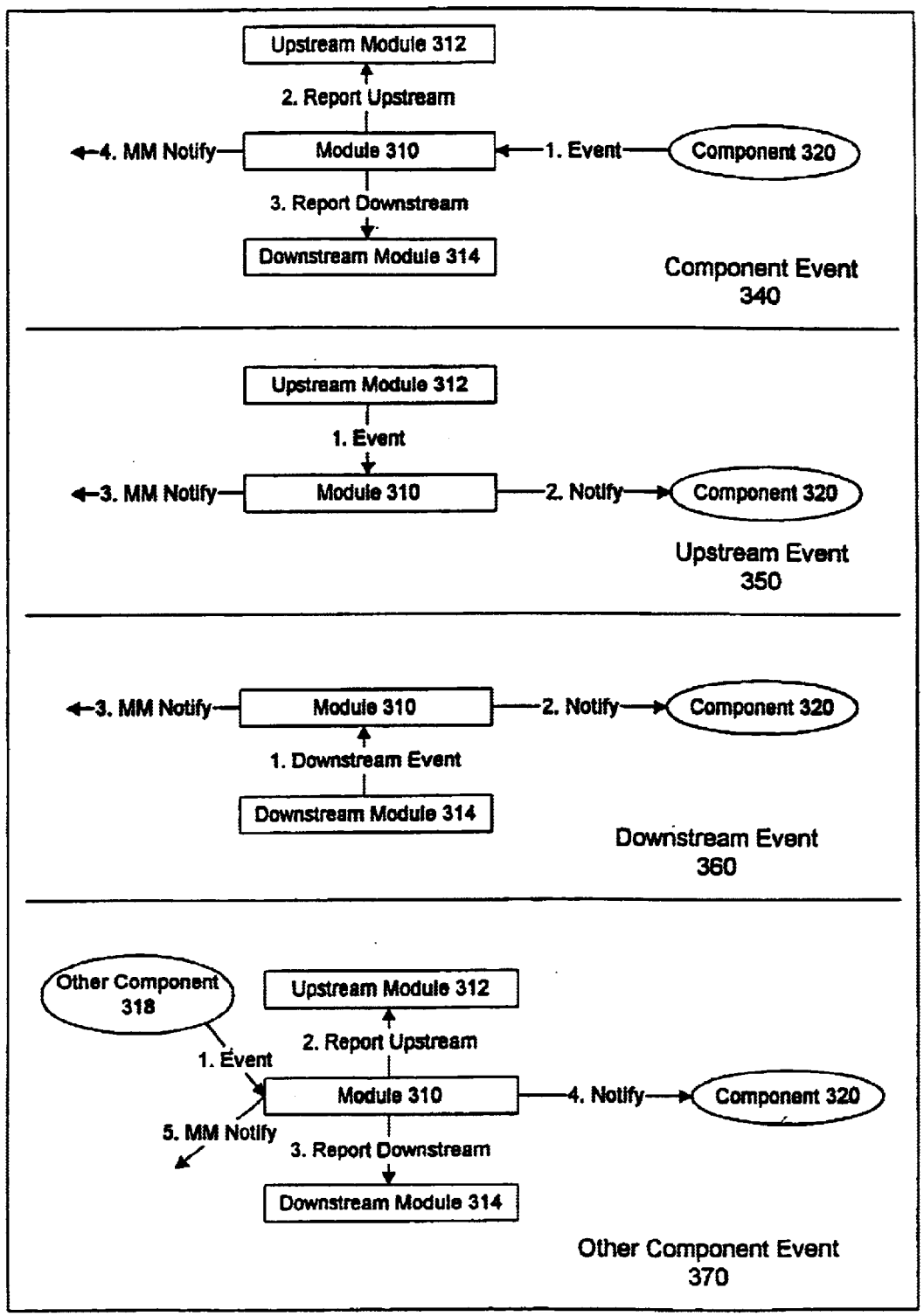
FIG. 3A and FIG. 3B illustrate a set of module event interactions in the path and port management system of FIG. 2.
Figure 3B:
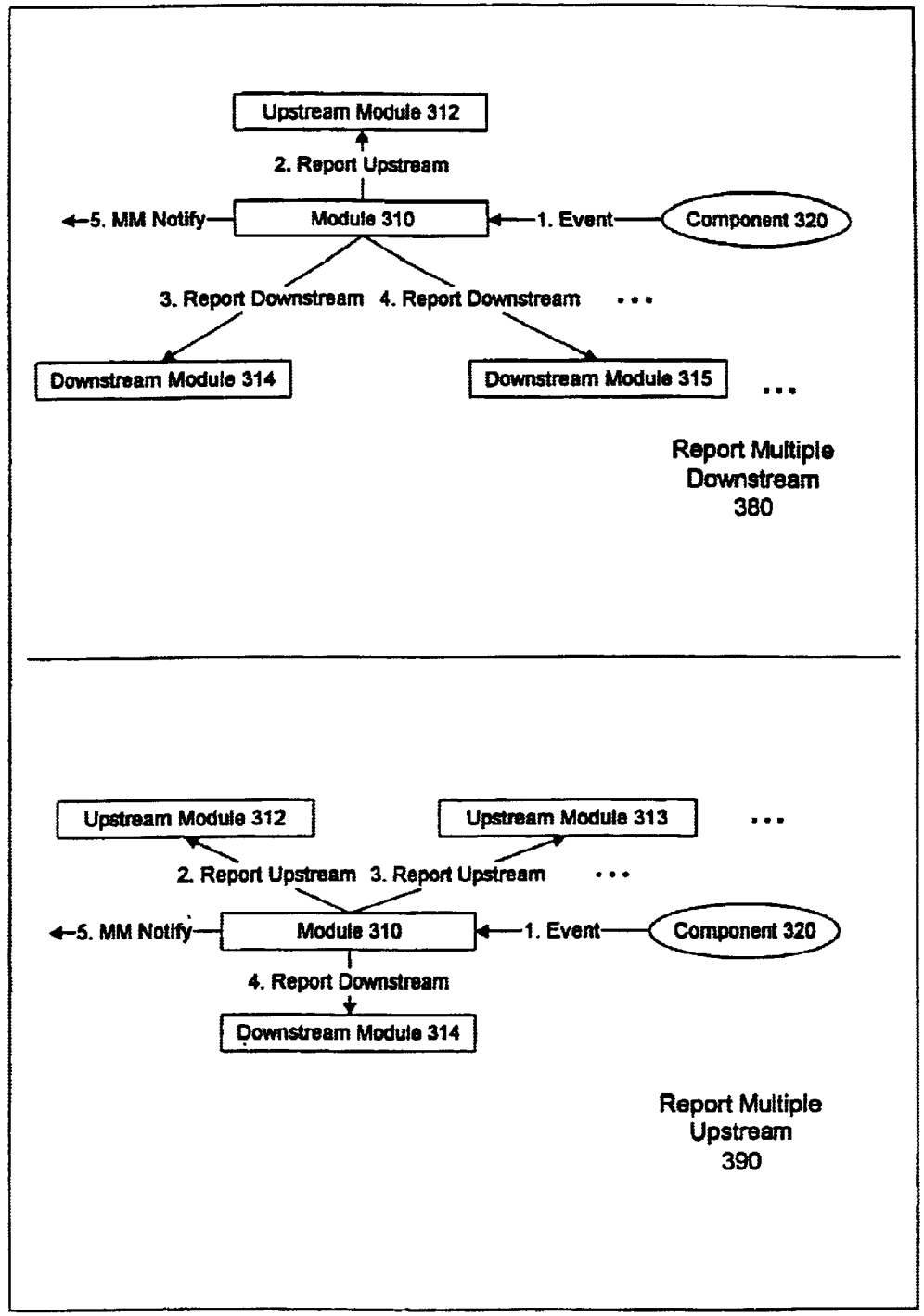

FIG. 3A and FIG. 3B illustrate a set of module event interactions in the path and port management system of FIG. 2. Module event interactions are defined by a set of rules and controlled by the module manager 116. In FIG. 3A and FIG. 3B, the modules 118 include finite state machines rather than have the module manager 116 include the finite state machine for use by all of the modules 118. However, in one embodiment, the module manager 116 includes the finite state machine and ensures that events are propagated appropriately.

In one embodiment, the types of events which may occur include the following messages: the next component upstream is UP or DOWN, the next component downstream is UP or DOWN, the next component upstream is AVAILABLE or is NOT AVAILABLE, the next component downstream is AVAILABLE or is NOT AVAILABLE, the next component upstream is ENABLED or DISABLED, and the next component downstream is ENABLED or DISABLED. Additional events can include control events, such as INITIALIZE, or query events, such as STATUS.

Component event 340 illustrates the case where an owner component 320 initiates a status event notification (e.g., "I am up"). The module 310 reports the event to its upstream module 312 and to its downstream module 314. The module 310 also reports the event to the module manager 116 (as the module includes the finite state machine).

In the embodiment where the module manager 116 the finite state machine, the module manager 116 determines that the upstream module 312 and the downstream module 314 are respectively above and below the module 310. The module manager 116 reports the events to the upstream component associated with the upstream module 312, using the references to functions in the upstream component in the upstream module 312. Similarly, the module manager 116 uses the references to functions in the downstream module 314 to report the event to the downstream component associated with the downstream module 314.

Upstream event 350 illustrates the case where an event arrives from the upstream module 312. In this case, the module 310 notifies the owner component 320 and the module manager 116.

Downstream event 360 illustrates the case where an event arrives from the downstream module 314. The module 310 reports the event to its owner component 320 and to the module manager 116.

Other component event 370 illustrates the case where an event originates from another component in the system (e.g., the communications manager). The module 310 reports the event to the upstream module 312, the downstream module 314, the owner component 320 and the module manager 116.

The report multiple downstream 380 illustrates the case where the module 310 has multiple dependent downstream modules. This may occur where multiple paths are bundled together for use by one port. The module 310 reports the event to the upstream module 312, to each of the dependent downstream modules (e.g., downstream module 314 and downstream module 315), and to the module manager 116.

The report multiple upstream 390 illustrates the case where the module 310 depends upon multiple upstream modules. The module 310 reports the event to the dependent upstream modules (e.g., upstream module 312 and upstream module 313), to the downstream module 314 and to the module manager 116.

Figure 4:
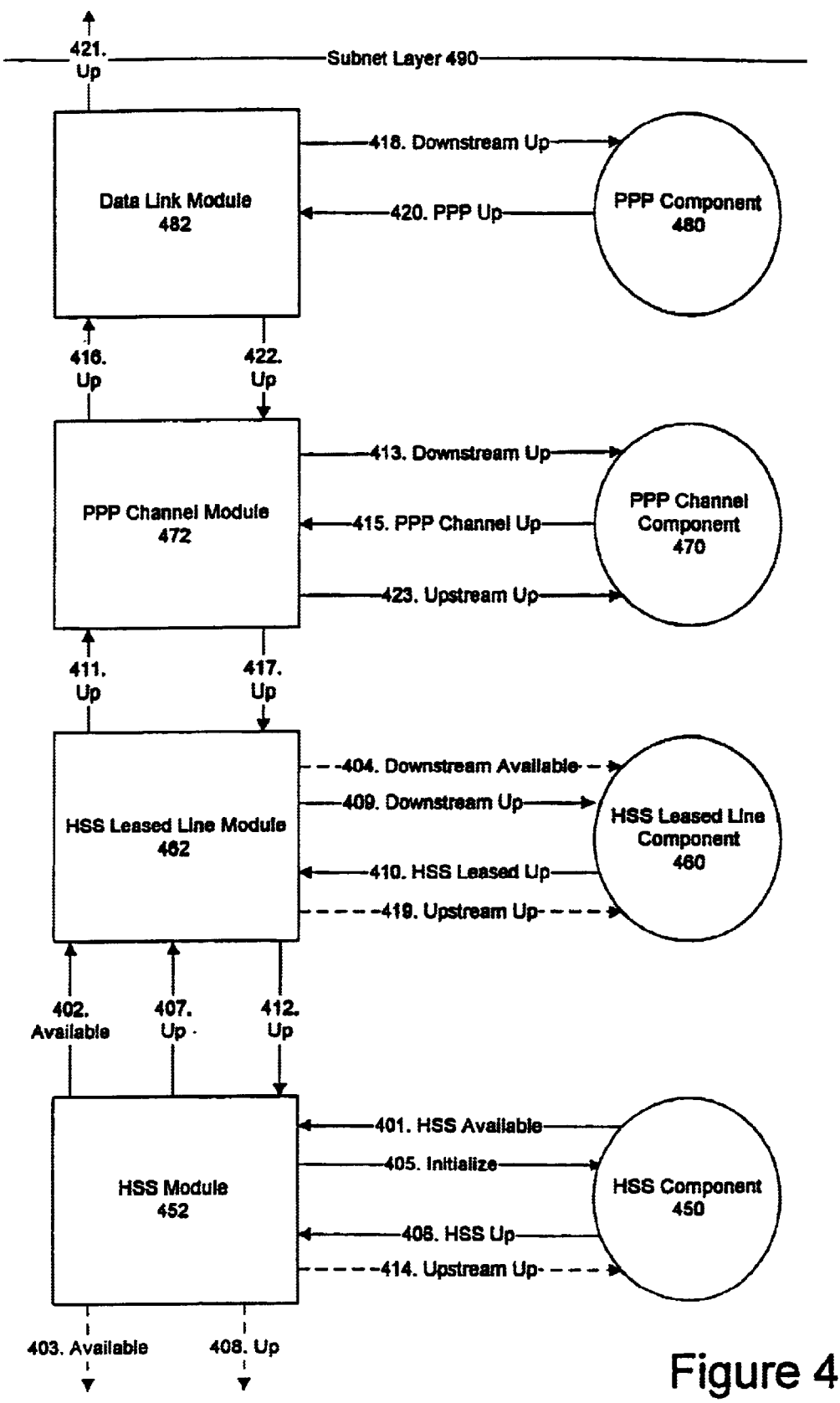
FIG. 4 illustrates an example of a point-to-point protocol (PPP) leased line control path initialized using the module event interactions.

FIG. 4 illustrates an example of a PPP leased line control path initialized using the module event interactions described above. The example of FIG. 4 is described as if a module directly notifies another module. However, in one embodiment, a component notifies a module, the module manager is notified as a result, and the module manager actually notifies the neighboring modules. Also note that the module manager 116 and the communications manager 202 are not shown to simplify the illustration; however, every module in this example has a link to the module manager 116. Importantly, FIG. 4 is only one example of one embodiment of the invention.

The module stack, of FIG. 4, includes an HSS module 452, an HSS owner component 450, an HSS leased line module 462, an HSS leased line owner component 460, a PPP channel module 472, a PPP channel owner component 470, a data link module 482 and a PPP owner component 480. The HSS module 452 is at the bottom of the stack while the data link module 482 is at the top of the stack. The HSS component 450 includes a device driver for an HSS device. The HSS leased line component 460 provides control functions and data functions necessary to support an HSS leased line connection. The HSS leased line component 460 is a specific example of a functional component that provides physical line control services for a serial line driver. The PPP channel component 470 provides PPP channel functions. The PPP component 480 provides further PPP functions.

At boot up of the network device, the HSS device initializes and notifies the HSS component 450. The HSS component 450 announces its availability to the HSS module 452 via the event 401. In one embodiment, the HSS component 450 call is the function fsm(moduleID, MODULE_AVAIL, HSS_module). This corresponds to a component event 340 of FIG. 3A.

The HSS module 452 communicates the MODULE_AVAIL event 402 upstream (e.g., using fsm(moduleID, DOWNSTREAM_AVAIL, HSS leased module)). Note that in an embodiment of the invention where the module manager 116 keeps track of all of the dependencies between the modules 118, neither the HSS module 452 nor the HSS component 450 know who the upstream module and/or component is, or even if there is an upstream module and/or component.

The HSS module 452 communicates the MODULE_AVAIL event 403 downstream but this is a no operation (no-op) function call since the HSS module 452 does not have a downstream module.

Upon receipt of the DOWNSTREAM_AVAIL event 402, the HSS leased line module 462 notifies HSS leased line component 460 by calling the registered status function in the HSS leased line module 462. The call corresponds to event 404. Receiving an DOWNSTREAM_AVAIL event does not trigger any action in the HSS leased line component 460, thus the event 404 is a no-op. In another embodiment, the HSS leased line component 460 may or may not act upon the DOWNSTREAM_AVAIL event, depending on the functions performed by the HSS leased line component 460.

The HSS module 452 notifies the HSS component 450 to enable via the event 405. In one embodiment, the communications manager 202 acts an observer component. As noted above, as an observer component, the communications manager 202 previously registered a request with the module manager 116 to be notified when a particular event occurs (e.g., whenever any component reports that it is available). In the example of FIG. 4, the module manager will pass the module available event onto the communications manager 202. The communications manager 202 will then request the module manager to send the enable event 405 to the HSS component 450.

Responsive to the event 405, the HSS component 450 initializes, enables, and reports a MODULE_UP event 406 to the HSS module 452. The HSS module 452 propagates a MODULE_UP event 407 upstream. (The HSS module 452 also propagates the MODULE_UP event 408 downstream, a no_op call.)

Responsive to the event 407, the HSS leased line module 462 notifies the HSS leased line component 460 using the DOWNSTREAM_MODULE_UP event 409. The event 409 triggers the HSS leased line component 460 to bring up the appropriate communications interface.

Responsive to the HSS leased line component 460 bringing up the leased line, the HSS leased line component 460 notifies the HSS leased line module 462 via a MODULE_UP event 410. The HSS leased line module 462 reports a DOWNSTREAM_UP event 411 upstream to the PPP channel module 472. The HSS leased line module 462 also reports an UPSTREAM_UP event 412 downstream to the HSS module 452. (The HSS module 452 communicates the UPSTREAM_UP event 414 to the HSS component 450, which can ignore the information.)

Based on the DOWNSTREAM_UP event 411, the PPP channel module 472 generates a DOWNSTREAM_UP event 413. In one embodiment, this is done by calling a status function earlier registered by the PPP channel component 470 called ppp_status( ) which is pointed to by the PPP channel module 472 via the pointer module_ptr→status_function.

When PPP channel component 470 successfully completes, the PPP channel component 470 reports MODULE_UP to the PPP channel module 472 via the event 415, e.g. by calling fsm(moduleID_of_PPP_Channel_Module, event=MODULE_UP). The PPP channel module 472 communicates the MODULE_UP event upstream to the data link module 482 via event 416. The PPP channel module 472 also communicates the MODULE_UP event downstream, via a DOWNSTREAM_UP event 417, to the to the HSS leased line module 462. (The HSS leased line module 462 notifies the HSS leased line component 460, via the event 419. However, the HSS leased line component 419 takes no action since it is already in the UP state.)

In response to the event 416, the data link module 482 sends a MODULE_UP event 418 to the PPP component 480.

The PPP component 480 responds to the event 418 with a MODULE_UP event 420. The event 420 causes the data link module 482 to report the event 421 to the subnet layer 490, if necessary. The event 420 also causes the data link module 482 to report the UPSTREAM_UP event 422 to the PPP channel module 472. The PPP channel module 472 notifies the PPP channel component 470 which does nothing in response to the event.

Thus, all of the components are in the UP state. None of the components are required to know who depends upon a given component, however, the components can now be used to transfer network data and control signals among themselves.

As noted above, data transfers are performed by using a reference within a module to a transmit or receive function. The kinds of pointers stored in each module in the data flow 130 in one embodiment is described above. Also as noted above, having as few levels of function call indirection in the data flow improves the performance of the data flow 130.

Figure 5:
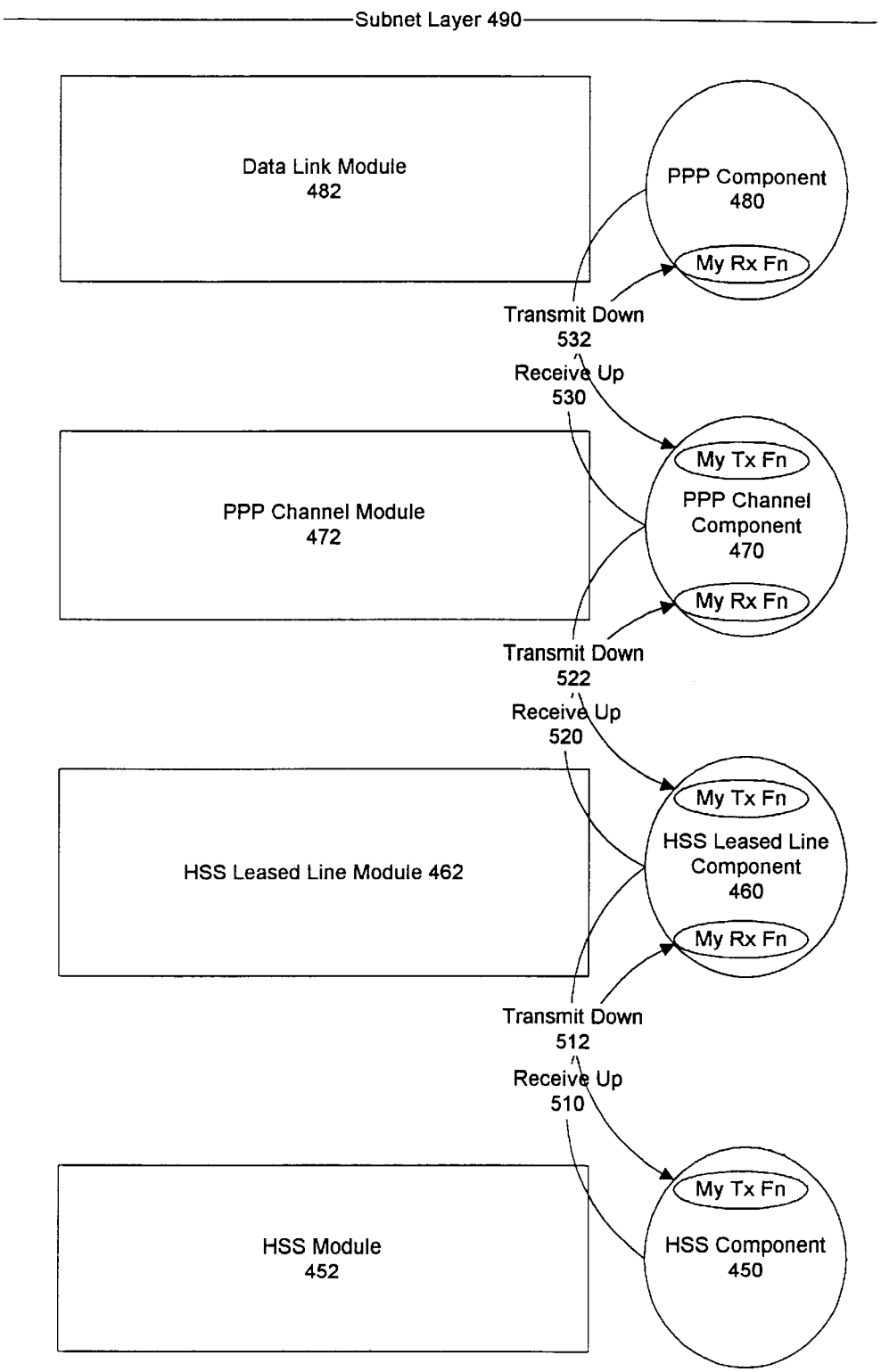
FIG. 5 illustrates data transfer interactions using the module stack of FIG. 4.

FIG. 5 illustrates data transfer interactions in the module stack of FIG. 4. Each of the modules 118 includes the pointers to the necessary transmit and receive functions described above. The following describes how a packet of information is transferred between the components.

Assume that a packet is received at the HSS device, and therefore the HSS component 450. The HSS component 450 finds the relevant module stack using the communications manager 202. Note that the HSS component 450 could be used by multiple module stacks so this step is important in determining which stack to use. The communications manager 202, in conjunction with the module manager 116, provides the HSS component 450 with a pointer to the HSS module 452. The HSS module 452 includes the module_owner control block pointer to be used by the HSS component 450.

When the HSS component 450 is ready to send the packet upstream, the HSS component 450 uses the module ID to find the upstream module link to the HSS leased line module 462. From the upstream module link, the HSS component 450 can now access the receive function pointer of the HSS leased line component 460. Now the HSS component 450 can directly call the receive function of the HSS leased line component 460 and provide the packet directly to that component. The call is represented by the receive up call 510. In one embodiment, the HSS component 450 calls module→rcv_module→rec$_{13}$ fn(packet, module→rcv_module→moduleID, module→rcv_module→module_CB). Note that no intervening functions are called while passing the packet to the HSS leased line component 460.

After the HSS leased line component 460 has completed processing the packet from the HSS component 450, the same process is repeated for the HSS leased line component 460. Thus, the HSS leased line component 460 makes the receive up call 520.

After the PPP channel component 470 has completed processing the packet from the HSS leased line component 460, the same process is repeated for the PPP channel component 470. The PPP channel component 470 can then make the receive up call 530.

An analogous process is used to send a packet down the module stack. The PPP component 480 makes the transmit down call 532; the PPP channel component 470 makes the transmit down call 522; and, the HSS leased line component 460 makes the transmit down call 512. The HSS component 450, using it's transmit function, causes the packet to be transmitted out on the network.

e. Bundled Channels Example

Figure 6:
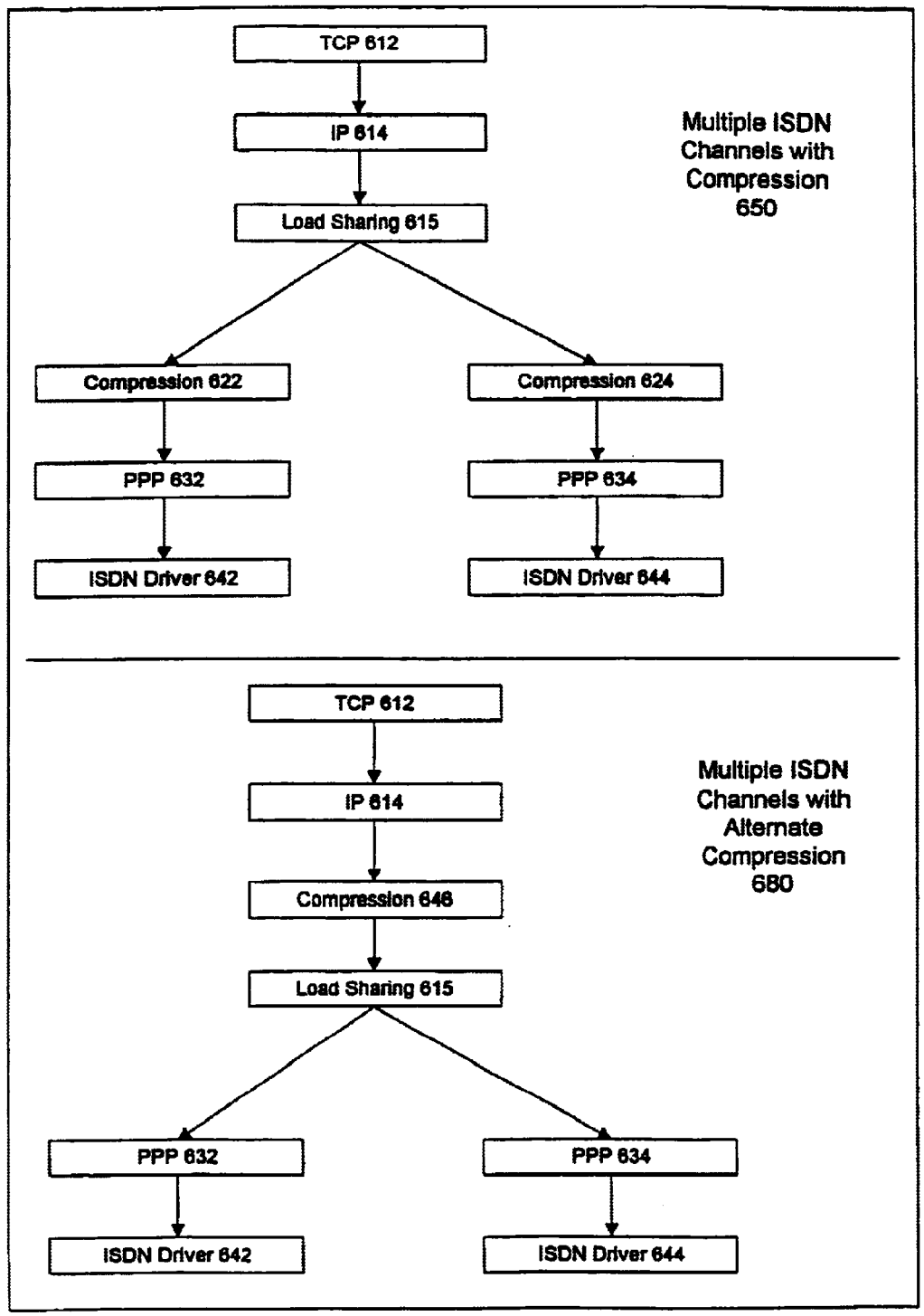
FIG. 6 illustrates an example of a bundled channels in a module stack.

FIG. 6 illustrates an example of bundled channels in a module stack. Only the modules 118 are shown in this example, however, each module is associated with a component 119.

The multiple ISDN channels with compression 650 example illustrates a module stack where TCP/IP is implemented over two ISDN channels. The stack includes, from top to bottom, a TCP module 612, an IP module 614, a load sharing module 615, a compression module 622, a second compression module 624, a PPP module 632, a second PPP module 634, an ISDN channel driver 642, and a second ISDN channel driver 644.

Note that the load sharing module 615 splits the control flow 120 and the data flow 130 into two. The load sharing module 615 and its corresponding owner component, by virtue of the event notification system, know how many modules depend on it (e.g., two, the compression module 622 and the compression module 624). Also note that the load sharing module need not know which modules depend upon it, only the number of modules that depend upon it. Therefore, the load sharing module can split the load of packets received from the IP module 614 module between its dependent modules. Note that the designer need only create the load sharing component once. Then the load sharing component can be used by a corresponding module in any module stack.

The compression module 622 represents another type of module that would be difficult to include in previous systems with the same degree of flexibility as found in one embodiment of the invention. For example, in the multiple ISDN channels with alternate compression 680, the compression module 646, corresponding to the same compression component as the compression module 622 and the compression module 624, is now above the load sharing module 615. To create the compression module 646 in this location in the stack, the user need only change the configuration information. Also note that a debugging module can be easily added to the stack or be used to replace the compression module 646. A statistics module can also be added to the stack or added as an observer component 203. Alternatively, a dial-on-demand module can replace the IP module 614 and a port queue handler module can replace the TCP module 612. Thus, this embodiment of the invention supports a flexible network communications protocol system.

f. Additional Alternative Embodiments

The following describes additional embodiments of the invention.

Although the above embodiments of the invention have been primarily restricted to the data-link network layer, other embodiments of the invention can be used so support network communications at other network protocol layers. For example, modules and components can be created for the network and transport layers. Other embodiments of the invention do no use modules and components to support the paths and ports, but do use modules and components to support the higher layer network protocols.

One embodiment of the invention is implemented in an object oriented language such as Java, Smalltalk, or C++. In this embodiment, the type information used by the module manager 116 to order modules in the module stack is inherent in the type of component object. Of course, other improvements are inherent in such an implementation, such as reducing the registration requirements of the components and the simpler reuse of code.

A method and apparatus to interconnect network protocol layers providing high-performance data transfers and flexible controls has been described. In one embodiment, the modules effectively insulate each component from knowing who its neighbor is. Thus, components can be easily combined according to a customer's needs. Additional components can easily be added to a system to support additional protocol layers or provide additional services such as testing, security and/or compression. Additionally, modules can have multiple dependent children modules so that channel bundling can be easily supported.

What is claimed is:

1. A method of receiving data from a network using a network device, the network device including a processor coupled to a memory and physical media connection, a first process including a device driver that provides an interface to a first network protocol layer, a device driver module that provides an interface between the device driver and a module management process, a second process that provides an interface to a second network protocol layer, a second module that provides an interface between the second process and the module management process, the method including the steps of:

receiving the data from the network at the physical media connection;

determining the data is a control information type that includes control information;

the device driver communicating to the device driver module a first event corresponding to the control information;

the device driver module communicating to the module management process a second event corresponding to the control information;

the module management process determining that the second module should be notified of the control information;

the module management process enabling a communication to the second module of a third event corresponding to the control information; and the second module communicating to the second process a fourth event corresponding to the control information.

2. The method of claim 1 wherein said control information causes said first process to be unavailable for data communications and wherein said first event includes an unavailable signal.

3. The method of claim 1 wherein said network device includes a third process, said third process providing an interface to a third network protocol layer, said third network protocol layer being different than said second network protocol layer and said first network protocol layer, said first network protocol layer being at lower protocol layer than said third network protocol layer and said second network protocol layer being at a higher protocol layer than said third network protocol layer, and if said data is said control information type then, determining said third process is to be notified in responsive to receiving said first event, and notifying said third process.

4. The method of claim 1 further including if said data is a data information type, then performing the following steps, said first process processing said data to generated a first processed data; and said first process directly requesting said second process to process said first processed data to generate a second processed data.

5. The method of claim 4 wherein said network device includes a first module, said first module providing an interface for said first process, said second process includes a first function for processing said first processed data, and wherein said first process directly requesting said second process to process said first processed data includes said first process accessing said first module to identify said first function and said first process calling said first function.

6. The method of claim 1 further comprising a computer readable medium having stored therein instructions for causing a processor to execute all the steps of the method.

7. A method of communicating data between a plurality of components in a network communications device, each component of said plurality of components providing a set of functions for different portions of a network protocol, said plurality of components including a first component, a second component and a third component, said second component including a set of functions for controlling said network protocol, said third component including a set of functions for transferring data according to a portion of said network protocol, said method comprising:

generating a module for each component of said plurality of components, including generating a first module correspond to said first component, a second module correspond to said second component and a third module corresponding to said third component;

receiving said data at said first component;

if said data corresponds to a data transfer, then said first component processing said data and said first module providing to said first component a reference to directly request processing of said data by said third component; and if said data corresponds to control information, then said first module causes a notification of said second component, said notification corresponding to said control information.

8. The method of claim 7 wherein said plurality of components includes a module manager, and wherein said first module causing said notification of said second component includes said first component notifying said module manager, and said module manager notifying said second component.

9. The method of claim 7 further comprising said third component including a data transmit function, said third component causing a storage of a pointer to said data transmit function, and said first module providing said reference includes said first module causing an access to said third module to identify said pointer and said first module providing said pointer to said first component.

10. The method of claim 7 further comprising said third component including a quick data transmit function, said third component causing a storage of a pointer to said quick data transmit function, and said first module providing said reference includes said first module causing an access to said third module to identify said pointer and said first module providing said pointer to said first component.

11. The method of claim 10 wherein said first module includes a second reference to said third module and wherein said first module causing an access to said third module includes said first module providing said second reference to said first component.

12. The method of claim 7, wherein said first component includes a high speed serial device driver, wherein said second component includes a point to point communications control program, and wherein said third component includes a point to point communications data transfer program.

13. The method of claim 7 further comprising a computer readable medium having stored therein instructions for causing a processor to execute all the steps of the method.

14. A method of bundling a plurality of device driver processes to support data communications in a network device, said network device including a plurality of physical media connections, a plurality of processes and a plurality of modules, said plurality of processes including programs for implementing communications and including said plurality of device driver processes, each process of said plurality of processes implementing a set of functions to transmit data, receive data, and control said each process, said plurality of processes including a data link layer process, a first device driver process, and a second device driver process, said plurality of modules providing an interface to said plurality of processes, said plurality of modules including a data link layer module, a first module, a second module and a third module, said method comprising the steps of:

storing a first set of references corresponding to said set of functions for said first device driver process in said first module;

storing a second set of references corresponding to said set of functions for said second device driver process in said second module;

storing a third set of references indicating a dependence of said first module and said second module on said third module; and said data link layer process accessing said third module to communicate said data directly to one of said first device driver process and said second device driver process by using respectively said first set of references and said second set of references.

15. The method of claim 14 wherein said network device includes a module manager for managing an interaction between said first module, said second module and said third module, and wherein said storing said third set of references includes said module manager storing a set of pointers for said third module indicating a dependence on said third module by said first module and said second module.

16. The method of claim 15 wherein said data link layer process accessing said third module includes said data link layer process accessing said module manager to identify said third module.

17. The method of claim 14 wherein said data link layer process includes a load sharing function.

18. The method of claim 14 further comprising a computer readable medium having stored therein instructions for causing a processor to execute all the steps of the method.

* * * * *